(12) United States Patent
Jahkonen et al.

(10) Patent No.: US 6,898,094 B2
(45) Date of Patent: May 24, 2005

(54) DC/DC BRIDGE CONTROL UNIT FOR CONTROLLING A DIRECT-CURRENT LOAD

(75) Inventors: Pekka Jahkonen, Hyvinkaa (FI); Esa Putkinen, Hyvinkaa (FI)

(73) Assignee: Kone Corporation, Helsinki (FI)

( * ) Notice: Subject to any disclaimer, the term of this patent is extended or adjusted under 35 U.S.C. 154(b) by 43 days.

(21) Appl. No.: 10/387,497

(22) Filed: Mar. 14, 2003

(65) Prior Publication Data

US 2004/0105286 A1 Jun. 3, 2004

Related U.S. Application Data

(63) Continuation-in-part of application No. 10/352,205, filed as application No. PCT/FI02/00767 on Sep. 24, 2002, now Pat. No. 6,697,273.

(30) Foreign Application Priority Data

Nov. 19, 2001 (FI) .............................................. 20012244
Feb. 7, 2003 (FI) ............................................. 20030190

(51) Int. Cl.[7] ........................ H02M 3/24; H02M 7/5387
(52) U.S. Cl. ........................................ 363/98; 363/132
(58) Field of Search .............................. 363/16, 17, 97, 363/98, 131, 132; 318/801, 803, 806

(56) References Cited

U.S. PATENT DOCUMENTS

| | | | |
|---|---|---|---|
| 5,107,190 A | | 4/1992 | Schultz et al. |
| 5,428,522 A | | 6/1995 | Millner et al. |
| 5,703,768 A | * | 12/1997 | Kanna et al. .................. 363/98 |
| 5,757,636 A | * | 5/1998 | Fletcher ........................ 363/98 |
| 5,912,813 A | * | 6/1999 | Kerkman et al. ............. 363/98 |
| 6,131,692 A | * | 10/2000 | Kawasuji ..................... 180/446 |
| 6,172,882 B1 | * | 1/2001 | Tanaka et al. ................. 363/17 |
| 6,211,657 B1 | | 4/2001 | Goluszek |
| 6,288,507 B1 | | 9/2001 | Makino et al. |
| 6,486,632 B2 | * | 11/2002 | Okushima et al. .......... 318/599 |
| 6,630,751 B2 | * | 10/2003 | Curtis et al. ................... 307/64 |
| 6,678,177 B2 | * | 1/2004 | Asano et al. ................. 363/98 |
| 6,697,273 B1 | | 2/2004 | Jahkonen et al. |

FOREIGN PATENT DOCUMENTS

| | | |
|---|---|---|
| DE | 3428239 A1 | 3/1985 |
| EP | 0 352 728 A2 | 1/1990 |
| JP | 59-216489 A | 12/1984 |
| JP | 10-164888 A | 6/1998 |

OTHER PUBLICATIONS

Abdelhamid, T.H., "Single–phase DC drive system controlled by sinusoidal PWM full–bridge DC–DC converter with improved input current waveform," IEEE International Electric Machines and Drives Conference, IEMDC '99, Seattle, WA, USA, May 9–12, 1999, pp. 670–672.

Abdelhamid, T.H., "Single–phase DC drive system controlled by sinusoidal PWM full–bridge DC–DC converter with improved input current waveform," IEEE International Electric Machines and Drives Conference, IEMDC '99, Proceedings of Electric Machines and Drives Conference, Seattle, WA, May 9–12, 1999, pp. 670–672.

* cited by examiner

Primary Examiner—Matthew V. Nguyen
(74) Attorney, Agent, or Firm—Birch, Stewart, Kolasch & Birch, LLP

(57) ABSTRACT

A DC/DC bridge having a power stage provided with controllable semiconductor switches controls a direct currently load, and comprises two bridge sections, one of which bridge sections conducts direct currently while the other bridge section is controlled via pulse width modulation to regulate the current magnitude. Two of three bridge arms of the DC/DC bridge are connected in parallel and semiconductor switches in the parallel-connected bridge arms are controlled via pulse width modulation to form a pulse width modulation controlled bridge section.

10 Claims, 3 Drawing Sheets

DC/DC BRIDGE CONTROL UNIT FOR CONTROLLING A DIRECT-CURRENT LOAD

This application is a Continuation-In-Part of U.S. application Ser. No. 10/352,205, filed Jan. 28, 2003, now U.S. Pat. No. 6,697,273, which is the National Phase of PCT International Application No. PCT/FI02/00767 filed on Sep. 24, 2002, on which priority is claimed under 35 U.S.C. § 120, the entire contents of which are hereby incorporated by reference.

BACKGROUND OF THE INVENTION

FIELD OF THE INVENTION

The present invention relates to a DC/DC bridge for controlling a direct-current load, said bridge having a power stage provided with controllable semiconductor switches and comprising two bridge sections, one of which bridge sections conducts direct current while the other one is controlled via PWM to regulate the current magnitude.

DISCUSSION OF THE BACKGROUND ART

Elevator motor drives may be either alternating-current or direct-current motor drives. The drives may be controlled e.g. via PWM (Pulse Width Modulation). Today, alternating-current motor drives are fairly common, especially because of the simple construction of alternating-current motors. However, direct-current motor drives are still in use. It is not always appropriate to replace a direct-current motor drive with an alternating-current motor drive, because e.g. gearless direct-current motor drives and the direct-current motors used in them are durable, and it is therefore unnecessary to replace them with alternating-current motor drives. Besides, replacing the motor entails relatively high costs.

Since the trend is towards alternating-current motor drives, it is also hardly rational to specifically develop power electronics systems for use in the control of direct-current drives. In addition, semiconductor components, such as IGBTs, used in alternating-current drives are becoming increasingly efficient and economical. Moreover, it is to be expected that new regulations concerning network harmonics may result in future use of traditional thyristor bridges used in direct-current drives becoming more difficult.

SUMMARY OF THE INVENTION

The object of the invention is to overcome the drawbacks of prior-art technology and achieve a new type of PWM-controlled DC/DC bridge for a direct-current load, such as a direct-current motor. The solution of the invention is based on a new principle of power electronics topology, wherein it is possible to utilize the technology of alternating-current drives in the control of direct-current motors. In the solution of the invention, a PWM-controlled bridge section consists of two bridge arms, and the semiconductor switches in these bridge arms are turned on alternately in the conducting state.

By using the technology of the invention, it is possible to manufacture modern and economical PWM-controlled direct-current motor drives e.g. for elevator applications. By applying the invention, the power electronics technology and components of alternating-current drives manufactured in large production series can be utilized in direct-current drives. The conductor rails and other structures of the power stage circuits can be identical to those used in alternating-current drives. In addition, the use of semiconductor switches, such as IGBTs can be optimized even in direct-current applications. And, in particular, cost savings are achieved in development and production methods as the same methods can be used in both alternating-current and direct-current drives.

BRIEF DESCRIPTION OF THE DRAWINGS

In the following, the invention will be described in detail with reference to an example and the attached drawings, wherein.

DETAILED DESCRIPTION OF THE PREFERRED EMBODIMENT

Figure 1:
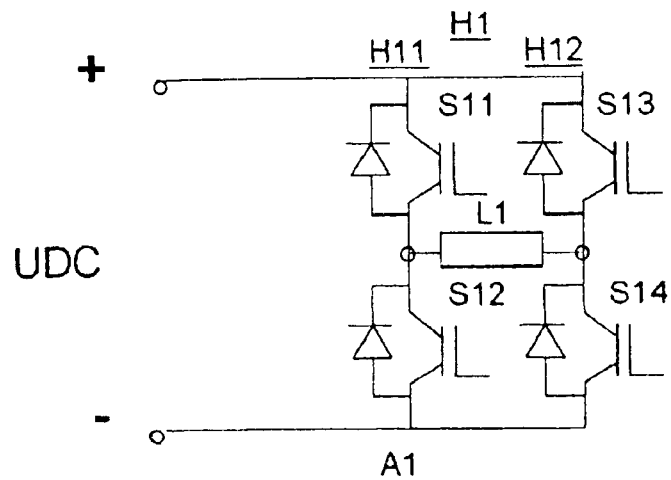
FIG. 1 presents a prior-art direct-current bridge.

FIG. 1 presents a prior-art PWM-controlled H-bridge H1 of a direct-current motor drive intended e.g. for an elevator application. It consists of two bridge arms H11 and H12 connected to a direct-current source UDC, each arm containing controllable semiconductor switches S11–S14 for the positive and negative poles, consisting of e.g. an inverse-parallel connection of an IGBT transistor and a diode. The bridge feeds a direct-current load L1, such as the direct-current motor of an elevator.

Figure 2:
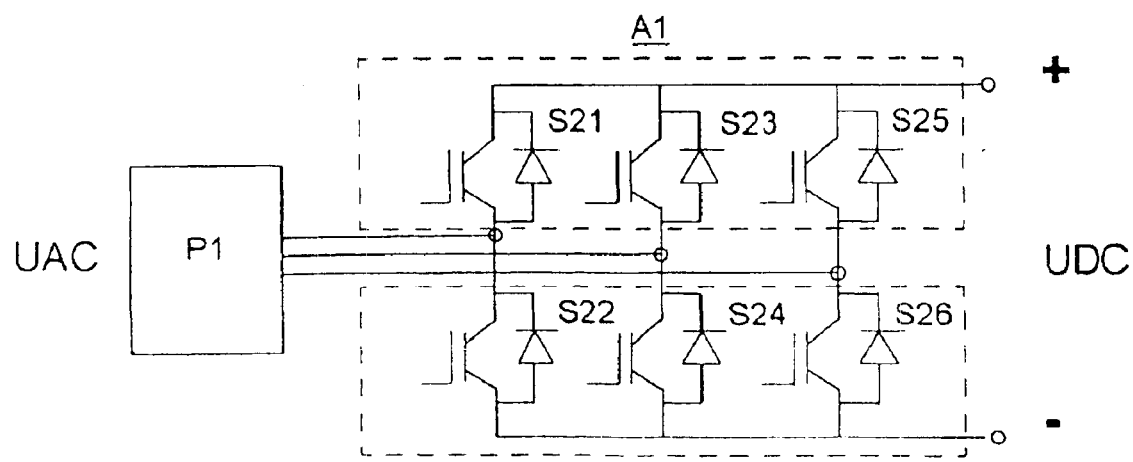
FIG. 2 presents a network bridge in an alternating-current drive.

FIG. 2 correspondingly presents a network bridge A1 as used in a prior-art three-phase alternating-current drive to rectify the alternating voltage of the network UAC into a direct voltage UDC, and an alternating-current inductor unit P1 connected before it. The bridge has in the upper and lower arms controllable semiconductor switches S21–S26, which are connected to each network phase and which may also consist of e.g. an inverse-parallel connection of an IGBT transistor and a diode.

In principle, the electric motor drive of the invention is like a prior-art three-phase alternating-current drive comprising a network converter (rectifier bridge), a motor bridge and inductors. The present invention relates expressly to the DC/DC bridge feeding the motor. The network bridge and the inductors may be e.g. as presented in FIG. 2. According to the invention, the same type of controllable semiconductor switches can be used in both the rectifier bridge and the motor bridge.

Figure 3:
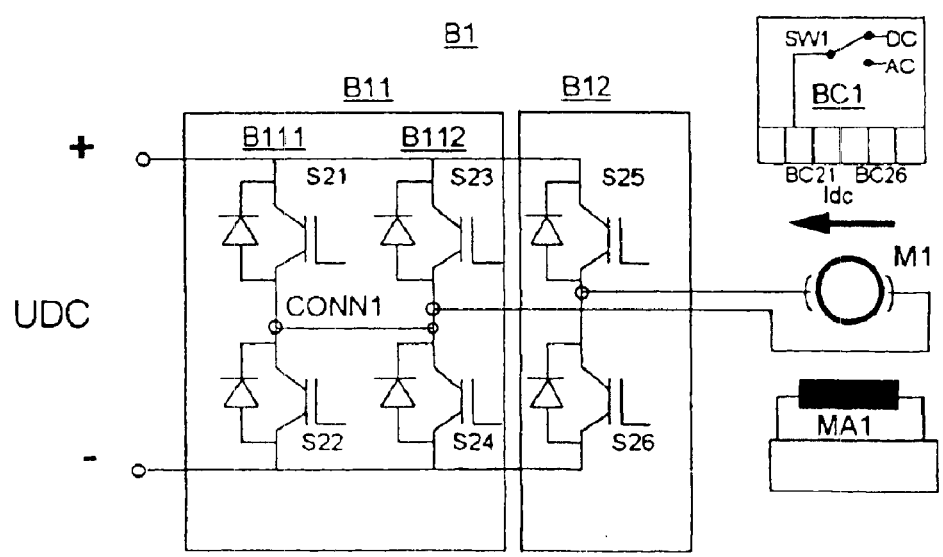
FIG. 3 presents a direct-current drive according to the invention, comprising a DC/DC bridge according to the invention.

FIG. 3 presents a DC/DC bridge B1 according to the invention, which is used to feed a direct-current motor M1, a direct current Idc flowing in the motor. The bridge is controlled by a control unit BC1. Magnetization of the motor is accomplished using a separate magnetizing unit MA1, which is controlled in a known manner.

The DC/DC bridge presented in FIG. 3 comprises two bridge sections B11, B12. The first bridge section in the bridge according to FIG. 3 comprises two arms B111 and B112, each containing controllable semiconductor switch units S21–S24. The bridge arms are connected to each other on the power stage circuit board via a connector CONN1. The second bridge section B12 consists of a single arm with controllable semiconductor switch units S25–S26. Thus, the bridge as a whole has three arms, corresponding to a three-phase DC/AC bridge. For each semiconductor switch, a controller BC21–BC26 is provided in the control unit BC1.

The modulation of the DC/DC bridge of the invention is done as follows: The PWM-controlled direct-current drive of the invention can use the same kind of semiconductor switches S21–S26 for PWM control as are used in an alternating-current drive. The direct-current drive can be selected e.g. by a switch SW1 in the control unit. Instead of alternating current, a zero-frequency is used (non-rotating field). In the direct-current drive of the invention, not all of the semiconductor switches have to switch a high-frequency PWM control signal, typically of a frequency of a few kHz; two of the switches, S25 and S26, can be used to select the torque direction (up/down), and the switches in question conduct pure DC current. The switches S21–S26 used for PWM control are turned on/off at a frequency of a few kHz to control the magnitude of the current Idc (the torque).

Figure 4:
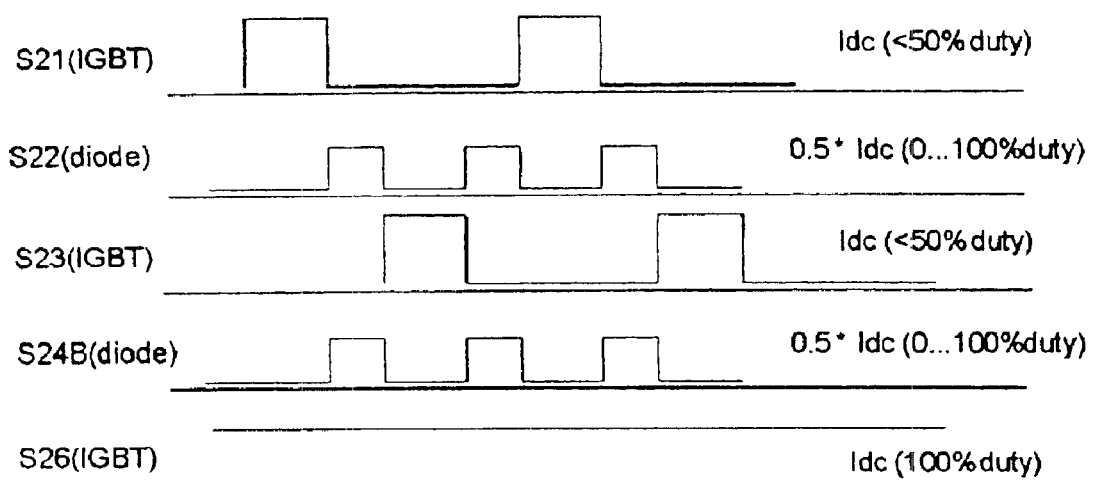
FIG. 4 presents a timing diagram for a DC/DC bridge according to the invention.

The greatest power dissipation occurs in the switches S21–S26 used for PWM control. In the control method of the invention, the switches used for PWM control are turned into conduction alternately in different arms, so the switches in question are only operated for about 50% of normal conduction time or less. This action is visualized in the timing diagram in FIG. 4, which represents the conduction times of switches S21, S23 and S26 as well as the conduction times of diodes S22 and S24.

From a thermal point of view, the invention provides the advantage that the power stage of an alternating-current drive can be fully utilized in a direct-current drive. Thermal dissipation in the IGBTs used in the circuit is typically double the dissipation in the switches that are not used in PWM control. Therefore, according to the invention, switches S21 and S23 are only kept conducting for at most 50% of the time in a cyclic manner. The conduction period varies according to the voltage (current) required.

As compared with the prior-art H-bridge, the circuit additionally provides the advantage that the ripple of the direct current Idc, which produces a disturbing noise, is reduced to about half of the original level. This advantage can be utilized by reducing the switching frequency of the PWM switches S21–S24, which will diminish thermal dissipation in the switches and increase the load capacity of the bridge.

Figure 5:
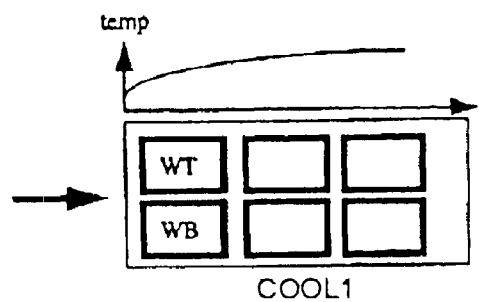
FIG. 5 illustrates the layout and cooling of the semiconductor switches in the DC/DC bridge of the invention.

In practice, direct-current switches may have higher dissipation because direct-current losses are slightly greater than switching-PWM losses. Therefore, switches S25 and S26 are placed on the air intake side (arrow) of the cooling segment COOL1 (FIG. 5) as it is cooler than the middle part of the segment or the air exit side, as indicated by the temperature curve TEMP.

It is obvious to the person skilled in the art that different embodiments of the invention are not limited to the example described above, but that they may be varied within the scope of the claims presented below. Besides IGBT, the switches used may also consist of other fully gate-controlled components. Besides a direct-current motor, the load may also consist of e.g. a braking magnet of an elevator.

The arrangement of the invention can be used in a wide range of electric drives. By applying the principle of the invention, it will be possible to cover the power range of direct-current elevator drives by using the latest IGBT technology. Alternating-current and direct-current drive modules can be assembled on the same production line, and the application can be selected mainly via software control.

What is claimed is:

1. A DC/DC bridge for controlling a direct-current load, said bridge being provided with controllable semiconductor switch units and having two bridge sections, one of which bridge sections conducts direct current while the other bridge section is controlled via pulse-width modulation (PWM) to regulate the current magnitude, wherein the DC/DC bridge is comprised of three bridge arms, two of which arms are connected in parallel, and wherein semiconductor switch units in parallel-connected bridge arms are controlled via PWM to form a PWM-controlled bridge section.

2. The DC/DC bridge according to claim 1, wherein the semiconductor switch units in the PWM bridge arms are turned on simultaneously.

3. The DC/DC bridge according to claim 1, wherein the semiconductor switch units switches in the PWM bridge arms are turned on alternately.

4. The DC/DC bridge according to claim 3, wherein the semiconductor switch units used for PWM control are so controlled that they conduct substantially for at most 50% of the conduction time of the bridge section.

5. The DC/DC bridge according to claim 1, wherein the semiconductor switch units are mounted as bridge arm blocks on a cooling base, to which a cooling medium, such as air, is supplied, and wherein the semiconductor switch units of the bridge section conducting direct current are disposed on a medium intake side.

6. The DC/DC bridge according to claim 5, wherein said blocks are placed at different distances from each other to optimize the cooling.

7. The DC/DC bridge according to claim 1, wherein the direct-current load is a direct-current motor.

8. The DC/DC bridge according to claim 1, wherein the direct-current load is a braking magnet of an elevator.

9. The DC/DC bridge according to claim 1, wherein the bridge arms are connected to each other on the power stage circuit board or at a point close to the power stage circuit board.

10. The DC/DC bridge according to claim 1, wherein said bridge can function in a direct-current drive and in an alternating-current drive, and said DC/DC bridge is connected to a switch for selecting the direct-current/alternating-current drive.

* * * * *